May 1, 1945.   M. CASERTA   2,375,076
RELIEF AND BY-PASS VALVE ASSEMBLY
Filed Dec. 4, 1943   2 Sheets-Sheet 1
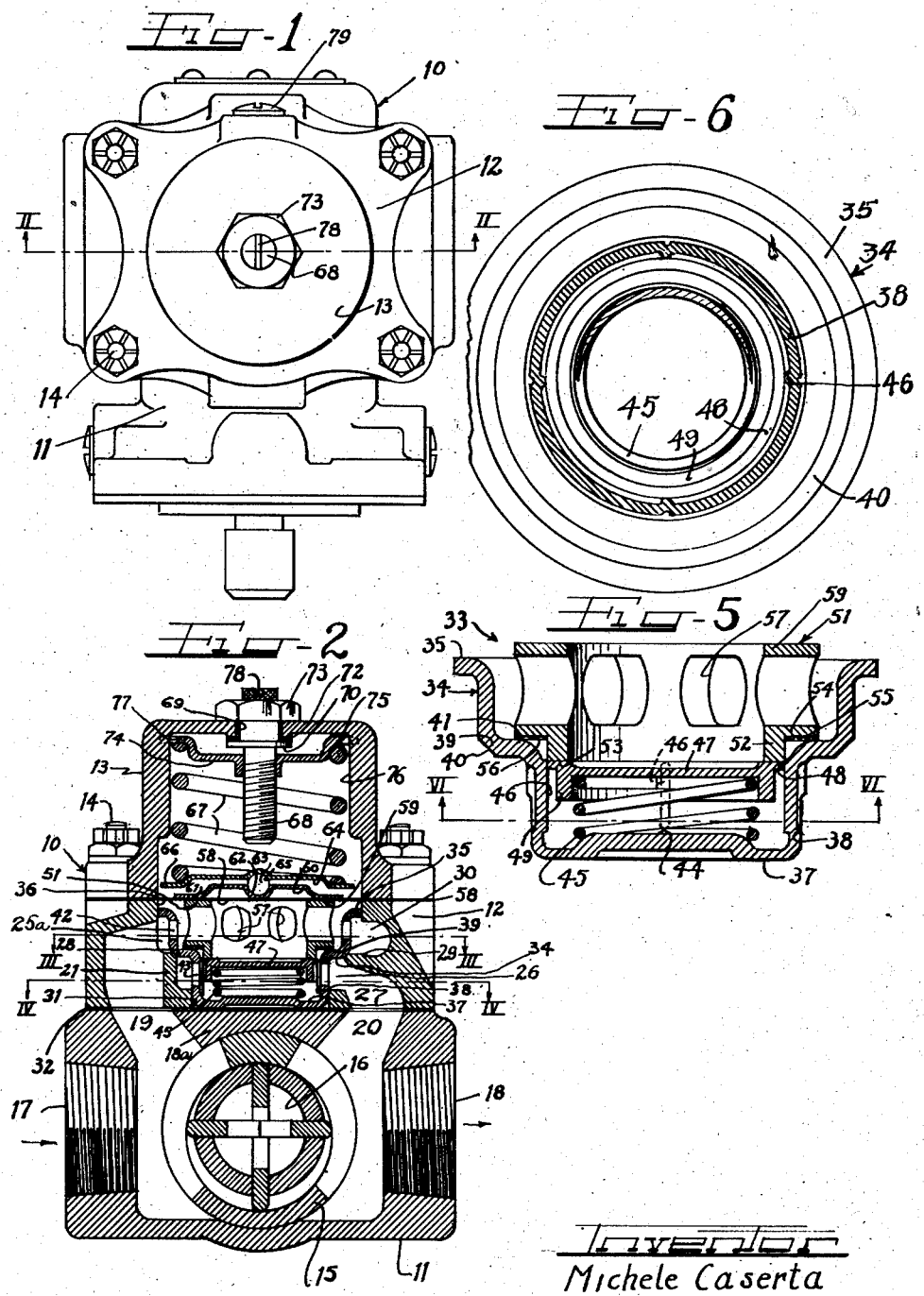
Inventor
Michele Caserta May 1, 1945. M. CASERTA 2,375,076
RELIEF AND BY-PASS VALVE ASSEMBLY
Filed Dec. 4, 1943 2 Sheets-Sheet 2
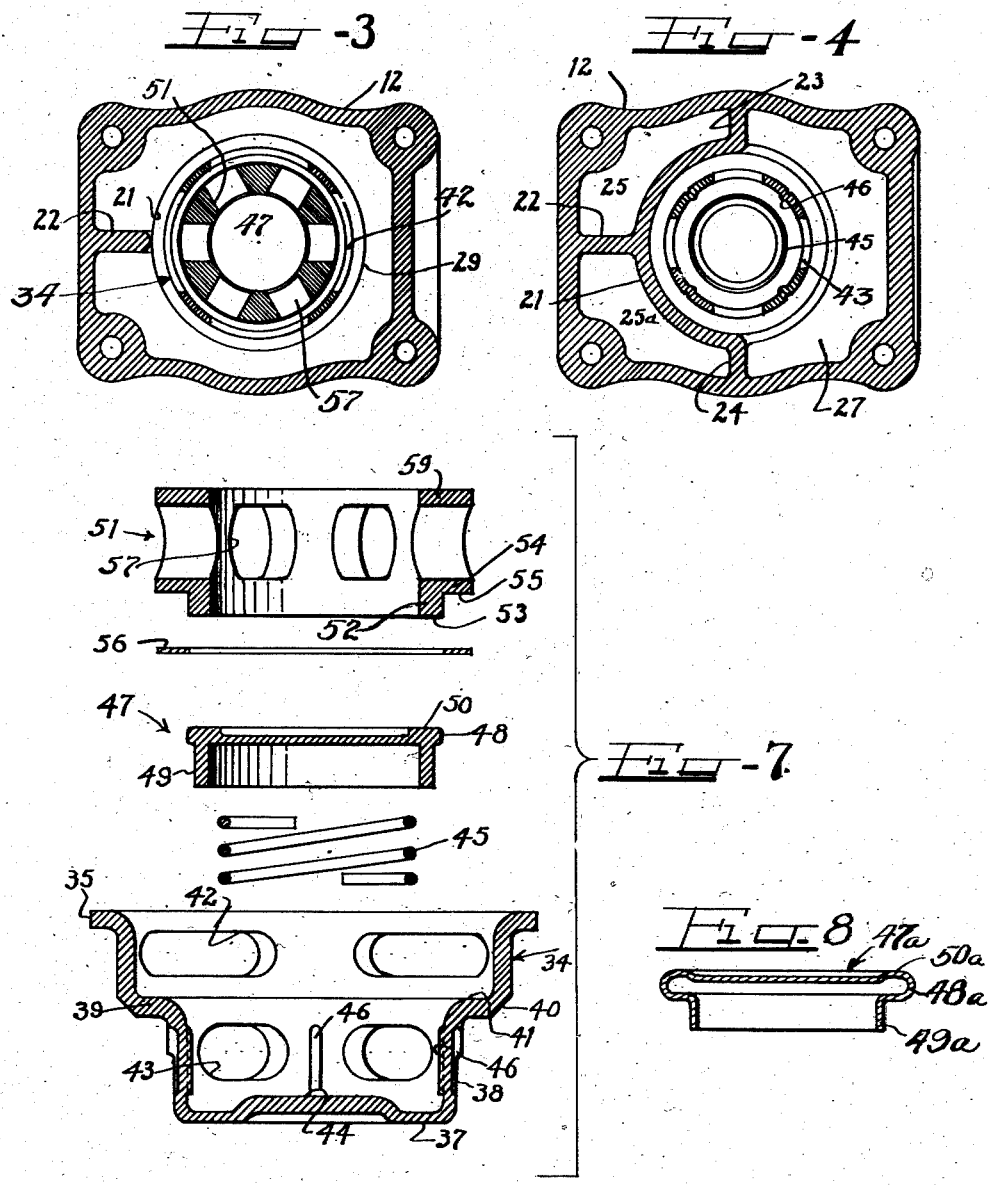
Inventor
Michele Caserta.

Patented May 1, 1945

2,375,076

UNITED STATES PATENT OFFICE 2,375,076

RELIEF AND BY-PASS VALVE ASSEMBLY

Michele Caserta, Detroit, Mich., assignor to Thompson Products, Inc., a corporation of Ohio Application December 4, 1943, Serial No. 512,891

8 Claims. (Cl. 277—45)

This invention relates to a relief valve and more particularly to a relief and by-pass valve assembly for use in pumps such as pumps used for the transfer of fuel in aircraft:

The present invention constitutes an improvement over the valve construction described in my pending application Serial No. 397,763, filed June 12, 1941. In that application I have shown a nested assembly of elements constituting both a relief valve and a by-pass valve in a fuel pump for aircraft.

According to the present invention, the relief and by-pass valves are so constructed and arranged as to reduce any tendency of the by-pass valve disk to become cocked, but even if the by-pass valve disk should become cocked, the construction is such that it cannot stick in operation. The relief valve is provided internally with upstanding, vertical ribs to serve as a guide for the by-pass valve disk, and the latter, because a disk-like rather than a piston-type element, cannot become stuck even if it should assume a cocked position with respect to said ribs. The disk is provided with a depending annular flange for partially enclosing and confining the upper end of the spring that urges the disk into closed position. The lower, closed bottom wall of the relief valve is also upwardly dished centrally for the purpose of centering the lower end of the by-pass valve spring.

It is therefore an important object of this invention to provide a relief and by-pass valve assembly of an improved construction whereby ease and certainty of operation are assured and any danger of the by-pass valve becoming cocked and stuck is practically eliminated.

Other and further important objects of this invention will be apparent from the disclosures in the specification and the accompanying drawings.

On the drawings:

Figure 1 is a top plan view of a pump with which my relief and by-pass valve assembly is particularly adapted to be used;

Figure 2 is a sectional view taken substantially along the line II—II of Figure 1, with parts in elevation;

Figure 3 is a sectional view taken substantially along the line III—III of Figure 2;

Figure 4 is a sectional view taken substantially along the line IV—IV of Figure 2;

Figure 5 is an enlarged sectional view taken along a plane passing through the axis of the relief and by-pass valve assembly, removed from the pump housing;

Figure 6 is a sectional view taken substantially along the line VI—VI of Figure 5;

Figure 7 is an enlarged sectional, exploded view of the relief and by-pass valve assembly showing the constituent elements thereof; and Figure 8 is a sectional view of a stamped metal by-pass valve disk.

As shown on the drawings:

The reference numeral 10 (Figs. 1 and 2) indicates generally an aircraft fuel pump with which a relief and by-pass valve assembly of my invention is particularly adapted to be associated. Said pump 10 comprises a pump casing 11, a valve housing 12 mounted thereon, and a valve housing cover 13 secured to said housing 12 and to the pump casing 11 by means of bolts and nuts 14. The pump here illustrated is of the rotary vane type, the bore of the pump casing 11 being provided with a pump liner 15 within which a rotor 16 is adapted to be driven. The pump casing 11 is provided with an intake 17 and an outlet 18 for connecting the pump in a fuel line to an engine, or other point to which fuel is to be delivered. Internally, the pump casing is divided by a partition 18A, on the intake side of which is formed a port 19, and on the outlet side of which is formed a port 20 both of which are in flow communication with interior portions of the valve housing 12.

Said valve housing 12 is formed with an axially concentric, annular partition 21, which, as best shown in Figures 3 and 4, is integrally cast with the valve housing 12, to which it is connected by web portions 22, 23 and 24. On the intake side of the partition 21, in conjunction with the web 22, said partition provides a pair of ports 25 and 25a that are in communication with the port 19 and the intake 17. On the outlet side of said annular partition 21 it is open as at 26 (Fig. 2) to provide flow communication from the outlet port 20 through a port 27 in the valve housing to the interior of said well-like partition 21. The inner upper edge of said partition 21 provides a relief valve seat 28, the full circumference of which is completed by a horizontally extending portion 29 of said partition 21. The interior of the valve housing 12 is thus divided into a lower portion including the port 27 and an upper cavity 30. The lower portion of the partition 21 is provided with an open cylindrical bore 31 (Fig. 2) of reduced diameter, for a purpose that will later appear. A gasket 32 having openings conforming with the ports 19 and 20, is suitably positioned between the pump casing 11 and the valve housing 12 for providing a tight joint therebetween.

The lower annular edge of the partition 21 rests directly upon said gasket 32, which is clamped between said lower edge and the partition 18A of the pump.

A relief and by-pass valve assembly, indicated by the reference numeral 33 (Fig. 5) is adapted to be assembled in nested relationship within the valve housing 12. Said assembly comprises a relief valve 34, suitably formed of a metal stamping with an upper, outturned cylindrical flange 35 in sliding contact with the cylindrical bore 36 formed in the upper portion of said valve housing 12, and with a lower closed bottom portion 37 having an upstanding cylindrical side wall 38 slidable within the bore 31. Said relief valve 34 is further formed with an intermediate offset portion 39, provided on its outer surface with a beveled seating face 40, and on its inner surface with a flattened shoulder 41. Above the offset portion 39, the side wall of the relief valve 34 is provided with ports 42, while ports 43 are formed in the lower side wall. The bottom wall 37 of said relief valve is provided with an upwardly dished central portion 44 for the purpose of centering a coiled spring 45, adapted to rest thereon. The lower side wall of said relief valve 34 is provided with inwardly extending ribs 46, which are parallel to the axis of said relief valve and which serve for guiding a by-pass valve disk 47, as will later be explained in greater detail.

The by-pass valve disk 47 is formed with an upper disk-like portion presenting an outer periphery 48 for sliding engagement with said ribs 46, and with a lower dependent annular flange 49 for partially enclosing and confining the upper end of said coiled spring 45. The by-pass valve disk 47 is also provided, on its upper face, with a raised, flat annular surface 50 which constitutes the seating surface of the disk, as will later be explained.

In Figure 8, there is illustrated a stamped metal disk 47a having parts corresponding to those of the valve 47 designated by the same reference numerals with the subscript a.

A by-pass valve 51 is adapted to be nested within the relief valve 34 to provide a seat for the by-pass disk 47. Said member 51 is formed with a dependent annular flange 52 having an outside diameter equal to the diameter of the circle defined by the inwardly extending ribs 46. The lower surface of said flange 52 provides a plane annular face 53 against which said by-pass disk 47 is adapted to be urged by the spring 45. Above said dependent annular flange 52, the by-pass valve 51 is provided with an annular shoulder 54, the bottom face 55 of which is plane and adapted to rest upon and be supported by the shoulder 41 of the relief valve 34. A thin washer 56 of flexible material, may suitably be positioned between the shoulders 55 and 41 to insure a seal therebetween. The upper portion of the by-pass valve 51 is provided with a plurality of radial ports 57 for permitting free flow of fluid from the upper chamber 30 through the ports 42 in the relief valve 34 to the interior of said relief valve 51 above the by-pass disk 47.

Thus, in case the rotor 16 is not operating and it is necessary to by-pass said rotor, the fuel can be caused to flow under pressure, as by means of an emergency hand pump (not shown), up through the port 19, through the corresponding ports 25 and 25a in the valve housing 12, through the ports 42 in the relief valve 34 and through the ports 57 in the relief valve 51 to act against the by-pass disk 47. Since the spring 45 is relatively very light, being merely sufficient to hold the by-pass disk 47 against its seat when the fluid pressure above and below the by-pass disk is substantially the same, said by-pass disk 47 is depressed to permit the fuel to continue in its flow through the opening thereby provided and out through the ports 43, 27 and 20 to the outlet side 18 of the pump casing.

In the operation of the by-pass disk 47, there is no tendency of the disk to become cocked and stuck, since the outer peripheral surface 48 is rounded (Fig. 7) to give the effect of a thin circular disk rather than that of a piston. Furthermore, the coiled spring 45 acts against the underside of said disk with a pressure that is uniformly distributed about its complete circumference and adjacent its outer periphery. The spring 45 is itself centered by the upstanding central portion 44 in the closed bottom 37 of the relief valve 34 and its top winding is confined within the dependent flange 49 of said by-pass disk 47, so that the spring cannot easily be displaced. In addition, the amount by which the spring 45 can be compressed is limited by the lower dependent flange 49 of the by-pass disk 47 striking against the closed bottom wall 37 of the relief valve 34, so that the spring 25 can never be compressed beyond its elastic limit.

As a matter of fact, the movement of the by-pass disk 47 is very slight in actual practice, since the opening that is uncovered is of such large diameter as to permit substantially unobstructed flow of the fuel upon slight depression of the by-pass disk.

Between the valve housing cover 13 and the valve housing 12, a diaphragm 58 is clamped about its periphery by the same bolts 14 that hold the pump casing 11, valve housing 12 and cover 13 together. With the relief valve 34 properly seated, the upper face 59 of said by-pass valve 51 extends into touching contact with said diaphragm 58.

A stamped metal washer 60 is positioned above said diaphragm 58 to rest thereagainst with its downwardly offset peripheral portion 61 opposing the upper annular surface 59 of said by-pass valve 51. Said disk 60 is further formed with a semi-spherical, centrally depressed portion 62 for receiving a ball 63. A second stamped metal disk 64 is formed with a complementary semi-spherical portion 65 which rests against said ball 63 to be centered thereby. Said disk 64 is also provided with a downwardly offset peripheral portion 66 which forms a seat for the bottom turn of a regulating spring 67 for adjusting the pressure against said diaphragm 5°.

The regulating mechanism ıcludes a screw 68, which is adapted to extend through an opening 69, centrally positioned in the top of said cover 13. Said screw 68 is provided with an integral flange 70, between which and the underside of the cover 13 is positioned a gasket 72. A checknut 73 serves to draw the flange and gasket tightly up against the under surface of the top wall of the cover 13 to provide a fluid-proof seal. A flanged disk 74 is operatively threaded upon the lower threaded end of the screw 68 and is provided with an offset peripheral flange 75 for bearing against the upper end of the coiled spring 67. For the purpose of guiding said disk 74, a plurality of longitudinally extending integral ribs 76 are formed on the inside of the side wall of said cover 13, and the peripheral flange 75 of said disk 74 is recessed as at 77 for sliding engagement with said ribs. The screw 68 is further provided with a screw-driver slot 78, by means of which the desired adjustment can be made from the outside, without removing the cover 13 or any accessory thereto.

To accomplish the adjustment of the regulating spring 67, and thereby regulate the amount of pressure exerted downwardly against the diaphragm 58, it is merely necessary to loosen the check nut 73 and turn the screw 68 in the desired direction. By virtue of the threaded engagement between the disk 74 and the threaded portion of the screw 68, said disk 74 will be moved upwardly or downwardly to lessen or increase the compression force of the spring 67. The slidable engagement between the ribs 76 of the cover 13 and the slotted periphery 77 of the disk 74 prevents said disk 74 from turning and insures a positive downward pressure against the spring 67.

Furthermore, any tendency of one end of the spring 67 to be deflected from the horizontal due to movement of the disk 74 is neutralized by reason of the free mobility of the disk 64 about the ball 63. As a result, only the axial component of the tension of the spring is transmitted, without any interfering factors, through the disk 64, the ball 63 and the disk 60 to the diaphragm 58. The downward pressure on the diaphragm is further transmitted through the by-pass valve 51 to the relief valve 34, through the gasket 56, whereby the relief valve is held against its seat with the desired pressure.

If it is desired, the interior of the cover 13 may be connected through a bore, shown in Figure 1 to be closed by a plug 79, to the supercharger. When so connected, the pressure upon the diaphragm 58 varies in accordance with the pressure developed in the supercharger and is independent of circumambient air pressure.

In the operation of the pump illustrated herein, the relief valve 34 is prevented from "chattering" by reason of the dashpot action brought about by the construction shown. Since the relief valve is provided with a closed bottom 37, and the lower portion of the relief valve has a sliding fit within the bore 31, this dashpot action is set up beneath said closed bottom 37 during movement of said relief valve either upwardly or downwardly. The relief valve 34 is also held against misalignment by reason of the upper cylindrical guiding surfaces 35 which have a sliding fit with the internal wall of the valve housing 12, and by the lower cylindrical side wall 38 of said relief valve that has a sliding fit in the bore 31 provided by the partition 21.

By virtue of the construction above described, the pressure of the fluid delivered by the pump can be maintained at that desired. In case the pressure tends to build up beyond that for which the relief valve is set, the fluid pressure acting upwardly against the offset portion 39 of said relief valve 34 and against the under side of the by-pass disk 47 will tend to lift the relief valve 34 off of its seat 28, and fluid will pass into the cavity 30 and through the ports 42 and 57 into the port 19 on the intake side of the pump. Fluid also passes through the port 43 in the lower portion of the relief valve 34 and out through the opening provided when the seat 28 is uncovered. Since the opening provided when the valve 34 is lifted off of its seat 28 is of relatively large diameter, the valve need be lifted only slightly to provide for the flow of a considerable volume of the fuel from the outlet to the intake side of the pump.

The ease of assembling the relief and by-pass valve structures of my invention should be observed. With the valve housing 12 open, it is merely necessary to drop the various elements making up the assembly into place in proper order, first the relief valve proper 34, next the spring 45 and the by-pass disk 47, and finally the by-pass valve 51. The gasket 56 can be conveniently slipped over the lower annular flange 52 of the seat member 51, before the latter is dropped into place. Because of the guiding and centering means provided, the parts nest into their assembled relationship without any particular care being required and without the necessity of using any special tools to effect the assembly.

Features of the pump construction here illustrated but not claimed are described and claimed in my copending application entitled "Rotary pump," Serial No. 480,278, filed March 24, 1943.

It will, of course, be understood that various details of construction may be varied through a wide range without departing from the principles of this invention and it is, therefore, not the purpose to limit the patent granted hereon otherwise than necessitated by the scope of the appended claims.

What I claim is:

1. A relief and by-pass valve assembly, comprising a relief valve member having a closed bottom and a ribbed lower cylindrical side wall provided with ports, a by-pass valve nesting inside said relief valve member and providing an annular seat, a by-pass disk slidable along said ribbed side wall for seating against said annular seat, and a spring confined under compression between said closed bottom and said by-pass disk to urge the latter against said seat.

2. A relief and by-pass valve assembly, comprising a relief valve member having a closed bottom and a ribbed lower cylindrical side wall provided with ports, a by-pass valve nesting inside said relief valve member and providing an annular seat, a by-pass disk slidable along said ribbed side wall for seating against said annular seat and having a lower annular skirt, and a spring confined under compression between said closed bottom and said by-pass disk within said skirt to urge the latter against said seat.

3. In a relief and by-pass valve assembly, a stamped metal relief valve member having an upwardly dished closed bottom, a by-pass valve nested within said relief valve member to provide an annular seat spaced from said bottom, a by-pass disk within said space having a dependent annular skirt, and a coiled spring centered by said dished bottom and confined at the top by said annular skirt for urging said by-pass disk against said seat.

4. In a relief and by-pass valve assembly, a stamped metal relief valve member having an upwardly dished closed bottom and a vertically ribbed cylindrical side wall extending therefrom, a by-pass valve nested within said relief valve member to provide an annular seat spaced from said bottom, a by-pass disk within said space guided by said ribbed side wall for movement therealong and having a dependent annular skirt, and a coiled spring centered by said dished bottom and confined at the top of said annular skirt for urging said by-pass valve against said seat.

5. A relief valve comprising a stamped metal cup-like member having a closed bottom, an intermediate external seating surface and upper and lower ported cylindrical side walls, the lower of said side walls being provided with vertical internal ribs for guiding a by-pass disk.

6. A relief valve comprising a stamped metal cup-like member having a closed bottom, an intermediate external seating surface and upper and lower ported cylindrical side walls, the lower of said side walls being provided with vertical internal ribs for guiding a by-pass disk and said bottom being upwardly dished centrally to center the lower end of a coiled spring to be positioned thereon.

7. A relief and by-pass valve assembly comprising a stamped metal cup-like relief valve member having a closed bottom, an intermediate external annular seating surface, and upper and lower ported cylindrical side walls, the lower of said side walls being provided with vertical internal guiding ribs, said bottom being upwardly dished centrally, a ported by-pass valve nested within said relief valve and having a lower annular seating surface, a by-pass disk having an upper peripheral annular surface for seating against said lower annular seating surface, a thin disk-like outer surface for guidance along said ribs and having a lower dependent annular skirt, and a spring between said by-pass disk and said bottom centered by the upwardly dished central portion of said bottom and confined within said dependent annular skirt, whereby to urge said by-pass disk against said lower annular seating surface.

8. A relief and by-pass valve assembly comprising a stamped metal cup-like relief valve member having a closed bottom, an intermediate external annular seating surface, an internal annular shoulder and upper and lower ported cylindrical side walls, the lower of said side walls being provided with vertical internal guiding ribs, said bottom being upwardly dished centrally, a ported by-pass valve nested within said relief valve to rest upon said internal annular shoulder and having a lower annular seating surface, a by-pass disk having an upper peripheral annular surface for seating against said lower annular seating surface, a thin disk-like outer surface for guidance along said ribs and having a lower dependent annular skirt, and a spring between said by-pass disk and said bottom centered by the upwardly dished central portion of said bottom and confined within said dependent annular skirt, whereby to urge said by-pass disk against said lower annular seating surface.

MICHELE CASERTA.